United States Patent [19]

Takemoto et al.

[11] Patent Number: 4,603,669
[45] Date of Patent: Aug. 5, 1986

[54] FUEL INJECTION PUMP HAVING VOLTAGE VARIATION COMPENSATION

[75] Inventors: Eiji Takemoto; Masahiko Miyaki, both of Oobu; Hideaki Norimatsu, Toyohashi; Nobuhito Hobo, Inuyama; Yoshihiko Tsuzuki, Toyota; Yoshimune Konishi, Okazaki, all of Japan

[73] Assignees: Nippondenso Co., Ltd., Kariya; Toyota Jidosha Kabushiki Kaisha, Toyota, both of Japan

[21] Appl. No.: 688,995

[22] Filed: Jan. 4, 1985

[30] Foreign Application Priority Data

Jan. 10, 1984 [JP] Japan .................................. 59-3287

[51] Int. Cl.⁴ .............................................. F02B 3/00
[52] U.S. Cl. .................................... 123/357; 123/449; 123/503; 123/506; 123/458; 123/459; 123/490
[58] Field of Search ............... 123/357, 490, 460, 458, 123/459, 480, 449, 506, 503

[56] References Cited

U.S. PATENT DOCUMENTS

| | | | |
|---|---|---|---|
| 4,092,717 | 5/1978 | Di Nunzio | 123/490 |
| 4,265,210 | 5/1981 | Hanisko | 123/490 |
| 4,328,526 | 5/1982 | Dilger | 123/490 |
| 4,385,611 | 5/1983 | Harper | 123/480 |
| 4,480,619 | 11/1984 | Igashira | 123/458 |

Primary Examiner—Ronald B. Cox
Attorney, Agent, or Firm—Cushman, Darby & Cushman

[57] ABSTRACT

A fuel injection pump is described wherein a plunger is rotatingly and reciprocally movable in an enclosure to define a compression chamber which is connected to a fuel inlet during an intake stroke of the plunger and to a fuel outlet during a compression stroke thereby to initiate injection of fuel to the outlet. A solenoid valve is responsive to a voltage applied from a voltage source for providing a pressure relief action on the fuel in the compression chamber. A control unit is responsive to the onset of fuel injection to determine a basic timing at which fuel is to be terminated and corrects the basic timing as a function of the source voltage to compensate for a voltage variation thereof which would otherwise affect on the operation of the solenoid valve. The solenoid valve is then energized at the corrected timing.

10 Claims, 7 Drawing Figures

| $N_p$ \ $V_B$ | ···· 8 ·· 12 ···· 16 ··· |
|---|---|
| 0 | |
| ⋮ | |
| 1000 | ·· T1 ··· T3 ··· |
| ⋮ | |
| 2000 | ··· T2 ··· T4 ··· |

FUEL INJECTION PUMP HAVING VOLTAGE VARIATION COMPENSATION

BACKGROUND OF THE INVENTION

The present invention relates to a fuel injection pump for internal combustion engines. In a known fuel injection pump of the type wherein fuel injection is terminated by a pressure relief action effected by means of a solenoid valve, the voltage applied to the solenoid tends to vary and causes the end of fuel injection timing to deviate from optimum timing.

SUMMARY OF THE INVENTION

It is therefore an object of the present invention to provide a fuel injection pump wherein the solenoid's source voltage variation is compensated by trimming fuel injection interval.

According to the invention, the injection pump comprises a plunger rotatingly and reciprocally movable in an enclosure to define a compression chamber of variable volume, the compression chamber being connected to a fuel inlet during an intake stroke of the plunger and connected to a fuel outlet during a compression stroke of the plunger thereby to initiate injection of fuel to said outlet. A solenoid valve is responsive to a source voltage for providing a pressure relief action on the fuel in the compression chamber. A control unit is provided to operate in response to the onset of fuel injection to determine a basic timing at which fuel is to be terminated, corrects the basic timing as a function of the source voltage to compensate for a voltage variation and applies the source voltage to the solenoid valve at the corrected timing. Preferably, trimming values are stored in memory addressible as a function of a voltage and read in response to the onset of fuel injection as a function of the source voltage.

BRIEF DESCRIPTION OF THE DRAWINGS

The present invention will be described in further detail with reference to the accompanying drawings, in which.

DETAILED DESCRIPTION

Figure 1:
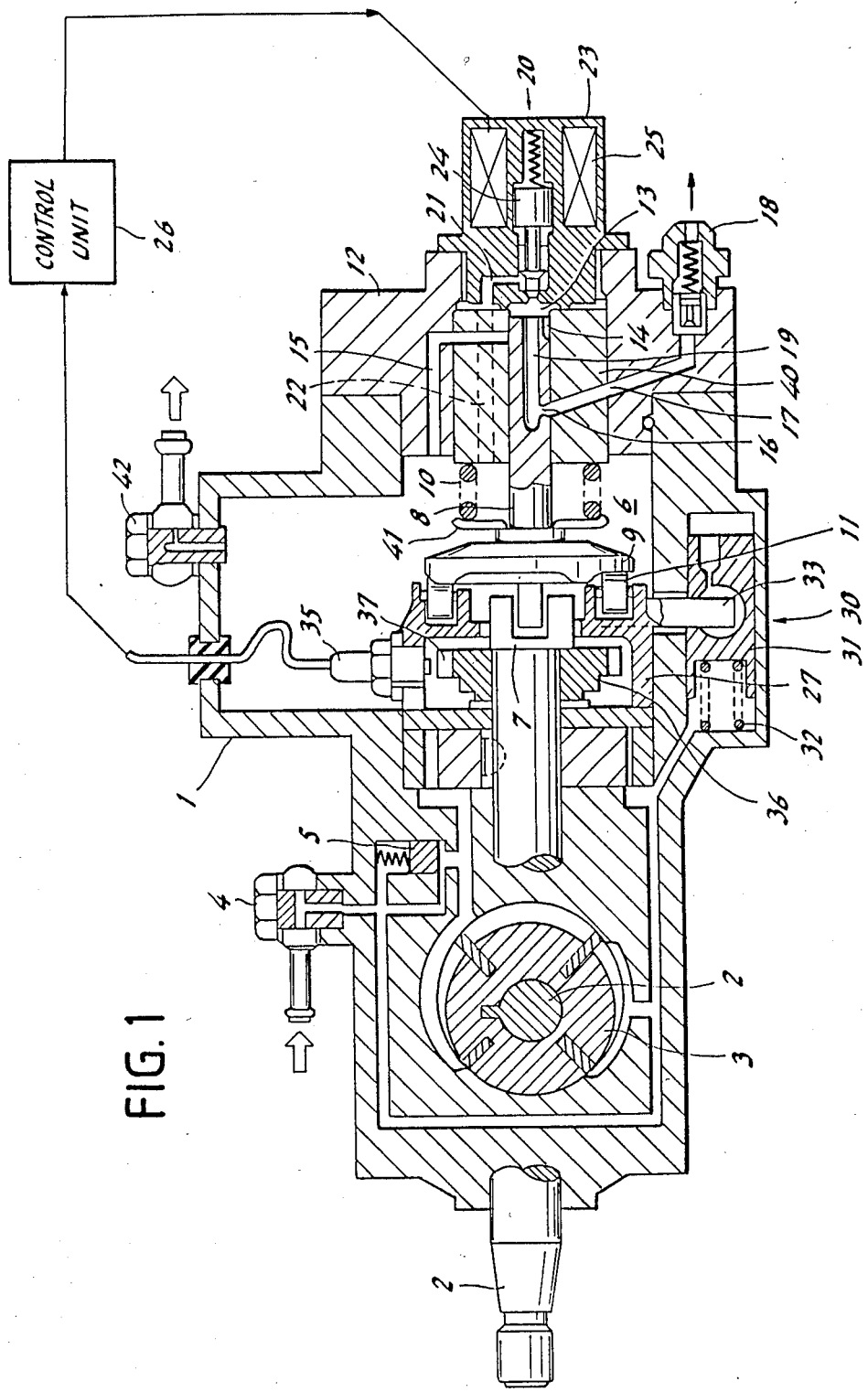
FIG. 1 is a diagrammatic view of a distribtor-type fuel injection pump embodying the invention.

FIG. 1 illustrates a distributor-type fuel injection pump comprising a housing 1 and a rotor shaft 2 rotatably that drives a vane-type feed pump 3 of known construction. The pump 3 sucks in fuel from a fuel source, not shown, through an inlet port 4 and pressurizes it to a level determined by the setting of a regulator valve 5, the pressure-regulated fuel being delivered to a fuel chamber 6.

A plunger 8 is axially movably and rotatably mounted in a sleeve 40. A face cam 9 secured to one end of plunger 8 is in pressure tight contact with cam rollers 11 by a spring 10 provided between sleeve 40 and a flange 41. The opposite end face of plunger 8 defines a compression chamber 14 with a fuel metering device 20. The face cam 9 is coupled to shaft 2 by a coupler 7 to permit plunger 8 to rotate with shaft 2, but allows it to move in axial directions with the rotation of cam 9 contacting roller 11 at different angular positions so that it reciprocates a number of times for each revolution corresponding to the number of engine cylinders.

The sleeve 40 is secured in a housing portion, or head 12 which is in turn secured at one end to housing 1. To the other end of head 12 is secured the fuel metering device 20. The head 12 is formed with a fuel intake passage 15 extending from chamber 6 down through the sleeve 40 to plunger 8. Plunger 8 is formed with a plurality of grooves, or cutouts 14 (only one is shown) adjacent the compression chamber 13 and a fuel feed passage 19 extending from the chamber 13 to a distribution port 16 which is sequentially in registry with each of a plurality of fuel delivery passages 17 extending respectively to associated nozzels 18. Each end groove 14 aligns with the fuel intake passage 15 as plunger 8 rotates in order to conduct fuel into compression chamber 13. The fuel in chamber 13 is therefore compressed when plunger 8 is moved to the right until distribution port 16 comes into registry with each delivery passage 17 to initiate fuel delivery.

Fuel metering device 20 comprises a solenoid 23 and a spill port 21 which communicates chamber 13 with chamber 6 via a pressure relief passage 22 formed in the sleeve 40. Solenoid 23 includes a needle valve 24 and a coil 25. Needle valve 24 is positioned in the passage of spill port 21 to open it when the coil is energized in response to an end-of-fuel injection timing pulse supplied from an electronic control unit 26 and shuts it off when the coil remains de-energized. Energization of coil 25 while plunger 8 is being moved during compression cycle provides a pressure relief action on the fuel in chamber 13 and terminates the supply of fuel to nozzle 18. The released fuel is exhausted through an outlet port 42.

The end-of-fuel injection timing pulse is generated in response to various engine operating parameters including engine speed, aceleration pedal position, engine temperature and etc. and in response to a timing signal derived in a manner to be described.

Cam rollers 11 are mounted on an annular support 27 whose angular position is adjusted by a known fuel injection timing adjuster 30 (the cross-sectional view of adjuster 30 is actually at right angles to the cross-sectional of the fuel pump). The timing adjuster 30 comprises a timer piston 31 and a shaft 33 which connects the piston 31 to the roller support 27. Fuel in chamber 6 exerts a pressure on one end face of the timer piston 31 and moves it in opposition to a spring 32 by an amount proportional to the pressure inside the chamber 6 and adjustably rotates the support 27 about the rotor shaft 2. Since the pressure inside chamber 6 is proportional to engine speed, the angular position of the rollers 11 and hence the time at which distribution port 16 comes into registry with delivery passage 17 is varied according to engine speed. Thus, fuel injection start timing is controlled as a function of engine speed.

A toothed wheel 36 having teeth 37 is mounted on rotor shaft 2. An electromagnetic pickup 35, mounted on roller support 27, generates a timing pulse in response to each tooth 37 rotating past pickup 35. This pulse is sent to the control unit 26 as an indication of a reference time. The period from the reference time to the time at which metering device 20 is to be energized is calculated by the control unit 26 as a function of the sensed engine operating parameters.

Since the pickup 35 rotates with roller support 27, the timing pulse is delayed by the same amount of delay introduced to the fuel injection start timing. This ensures that the amount of fuel to be injected be unaffected by the delay introduced to fuel injection start timing.

Figure 2:
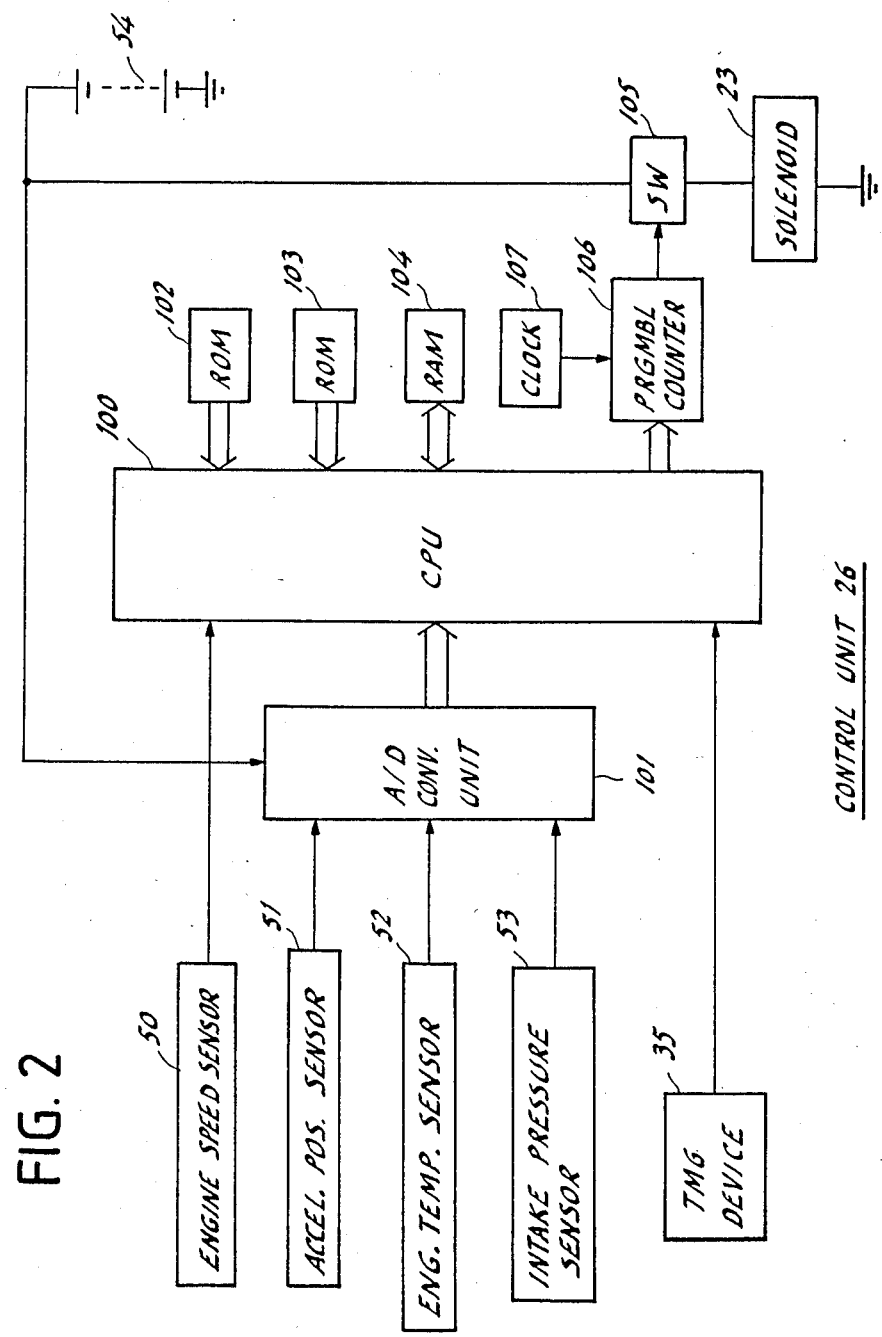
FIG. 2 is a block diagram of the fuel injection control unit of FIG. 1.

As shown in FIG. 2, control unit 26 comprises a microcomputer having a central processing unit 100, an analog-to-digital converter unit 101, read-only memories 102, 103 and a random access memory 104. Engine speed sensor 50 provides engine-speed indicating pulses to CPU 100. Acccelerator pedal position sensor 51, engine temperature sensor 52 and intake air pressure sensor 53 are connected to AD converter unit 101 to convert their respective analog signals to corresponding digital signals which are applied to CPU 100. A car battery 54 which supplies source voltage to solenoid 23 is connected to AD converter unit 101 to provide a digital value of the battery voltage to CPU 100. Read-only memory 102 stores instructions for operating CPU 100 and read-only memory 103 stores trimming data in locations addressable as a function of the digital value of source voltage in a manner to be described. The battery voltage is applied to solenoid 23 through a switching element 105 which closes in response to an end-of-injection timing pulse from CPU 100.

Figure 3:
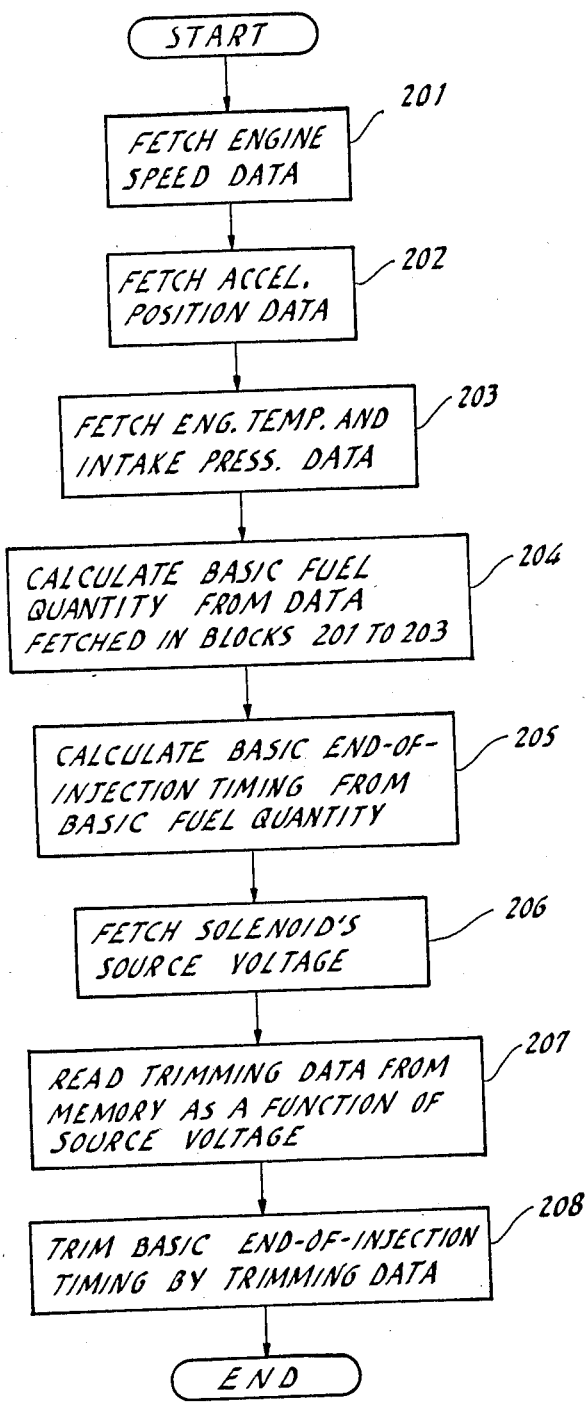
FIG. 3 is a flow diagram describing programmed steps performed by the central processing unit of FIG. 2.

FIG. 3 illustrates a flow diagram describing a series of functions performed by CPU 100. Operation of the microcomputer starts in response to the reference timing pulse from the timing device 35. In block 201 engine speed data is fetched from engine speed sensor 50. Accelerator pedal position data is fetched from detector 51 (block 202) and auxiliary data for compensating for engine temperature and intake manifold pressure are fetched from sensors 52, 53 (block 203). Basic fuel injection quantity is calculated in block 204 from the data fetched in blocks 201 to 203. The end-of-injection time is calculated from the basic fuel injection quantity. Source voltage data is fetched in block 206. As a function of the voltage trimming data is read out of memory 103. The trimming data is employed to trim the basic end-of-injection time to compensate for solenoid's source voltage variations (block 208). The corrected end-of-injection time data represents the period from the time of occurrence of the reference timing pulse to the time of occurrence of a timing pulse to be applied to the switching element 105. The corrected end-of-injection time data is applied to the preset input of a programmable counter 106. Counter 106 counts clock pulses from clock source 107 and generates an end-of-injection pulse when the count preset by the end-of-injection time data is reached. This pulse is applied to the switching element 105 to couple the source voltage to solenoid 23.

Figures 4, 5:
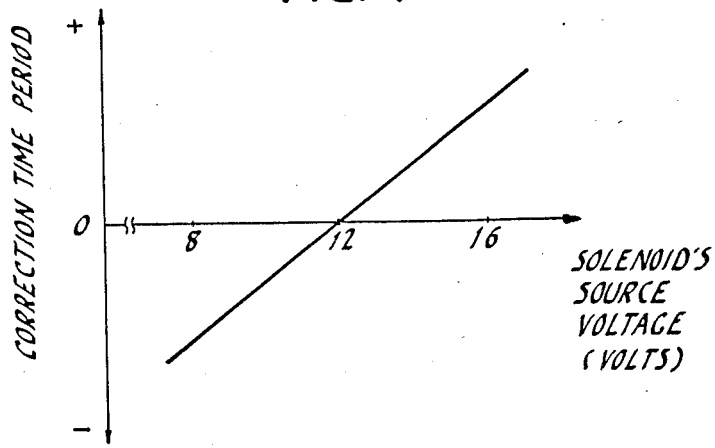
FIG. 4 is a graphic illustration of fuel injection trimming values stored in memory as a function of a source voltage.
FIG. 5 is an illustration of memory locations storing the trimming values as a function of source voltage and engine speed.
Figure 7:
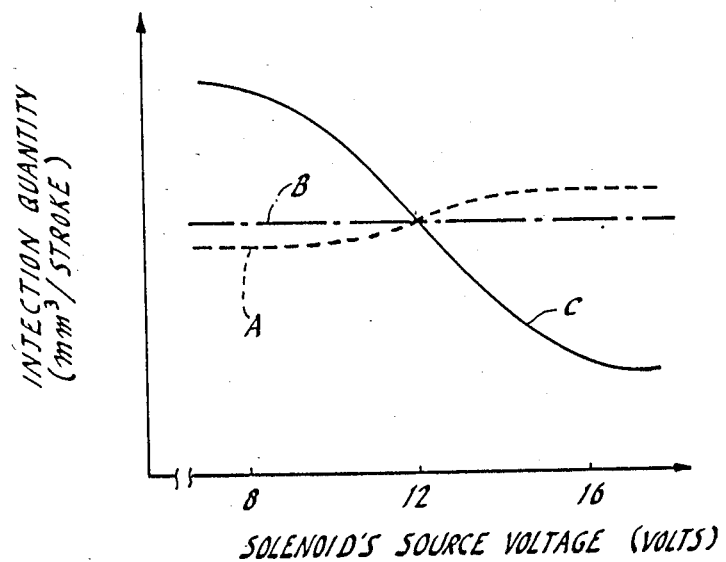
FIG. 7 is a graphic illustration of fuel injection quantity as a function of source voltage.

The trimming data is a sequence of linearly variable numerals T' stored in locations of memory 102 addressible as a function of the solenoid's source voltage VB as shown in FIG. 4. Curve A in FIG. 7 shows a plot of injected fuel quantities as a function of solenoid's voltage. As indicated, the fuel quantity substantially remains constant despite changes in solenoid's source voltage VB which would otherwise cause large fuel quantity variation as shown at C.

Figure 6:
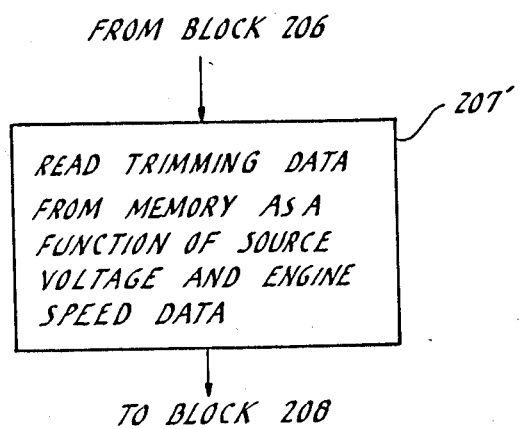
FIG. 6 is a flow diagram showing an alternative step associated with FIG. 5.

In a preferred embodiment, the trimming data is stored in locations addressable as a function of both source voltage VB and the rotational speed of pump 3 and hence engine speed Np as shown in FIG. 5. In that instance block 207 of the flowchart is replaced with a block 207' shown in FIG. 6 which shows that trimming data is read from memory 102 as a function of the two parameters. Curve B in FIG. 7 indicates that engine-speed related fuel quantity variation is completely eliminated and fuel quantity does not suffer from the source voltage and engine speed factors.

What is claimed is:

1. A fuel injection pump for use in diesel engines, comprising:
   an enclosure;
   pump means including a plunger rotatingly and reciprocally movable in the enclosure to define a compression chamber of variable volume, said pump means coupling said compression chamber to a fuel inlet during an intake stroke of the plunger and connecting the compression chamber to a fuel outlet during a compression stroke of the plunger to initiate injection of fuel to said outlet;
   a source of voltage having a tendency to vary;
   soleniod valve means operable when a voltage is applied thereto from said voltage source for providing a pressure relief action on the fuel in said compression chamber to terminate the injection of fuel; and
   control means responsive to the initiation of the fuel injection for determining a basic timing at which the fuel injection is to be terminated, detecting the voltage of said source, correcting the basic timing as a function of the detected voltage to thereby compensate for a voltage variation of said source and applying the detected voltage to said solenoid valve means at said corrected timing to thereby terminate the fuel injection.

2. A fuel injection pump as claimed in claim 1, further comprising means for detecting the speed of an internal combustion engine, wherein said pump means is responsive to the speed of said engine to pressurize the fuel in said inlet, and wherein said control means is responsive to the detected speed to correct said basic timing as a function of the detected engine speed.

3. A fuel injection pump as claimed in claim 1, further comprising:
   means for varying a phase of the reciprocating movement of said plunger in accordance with the speed of an internal combustion engine;
   signal generating means for detecting a predetermined angular position of said plunger and applying a signal in response to the detection of the predetermined angular position to said control means as an indication of the initiation of fuel injection; and
   means for adjustably mounting said signal generating means on a variable angular position with respect to said plunger in response to said phase varying means.

4. A fuel injection pump as claimed in claim 2, further comprising:

means for varying a phase of the reciprocating movement of said plunger in accordance with the speed of said engine;

signal generating means for detecting a predetermined angular position of said plunger and applying a signal in response to the detection of the predetermined angular position to said control means as an indication of the initiation of fuel injection; and means for adjustably mounting said signal generating means on a variable angular position with respect to said plunger in response to said phase varying means.

5. A fuel injection pump as claimed in claim 1, wherein said control means includes a memory for storing trimming data in locations addressable as a function of said source voltage and means for reading the stored data upon the initiation of fuel injection and correcting said basic timing with said trimming data read from the memory.

6. A fuel injection pump as claimed in claim 2, wherein said control means includes a memory for storing trimming data in locations addressable as a function of said source voltage and said detected engine speed means for reading the stored data upon the initiation of fuel injection and correcting said basic timing with said trimming data read from the memory.

7. A method for operating a fuel injection pump of a diesel engine, wherein the pump comprises an enclosure, pump means including a plunger rotatingly and reciprocally movable in the enclosure to define a compression chamber of variable volume, said pump means coupling said compression chamber to a fuel inlet during an intake stroke of the plunger and connecting the compression chamber to a fuel outlet during a compression stroke of the plunger to initiate injection of fuel to said outlet, a source of voltage having a tendency to vary, soleniod valve means operable when a voltage is applied thereto from said source for providing a pressure relief action on the fuel in said compression chamber to terminate the fuel injection, and a memory storing trimming values in locations addressable as a function of a voltage, said method comprising:

detecting engine operating parameters which determine fuel injection quantity;

deriving a basic end-of-fuel injection time from the detected engine operating parameters;

detecting the voltage of said source;

reading a trimming value from the memory locations in response to the initiation of the fuel injection as a function of the detected source voltage;

correcting said basic end-of-fuel injection time with said trimming value; and energizing said solenoid valve means in accordance with the corrected end-of-fuel injection time.

8. A fuel injection pump for an internal combustion engine, comprising:

an enclosure;

pump means including a plunger rotatingly and reciprocally movable in the enclosure to define a compression chamber of variable volume, said pump means coupling said compression chamber to a fuel inlet during an intake stroke of the plunger and connecting the compression chamber to a fuel outlet during a compression stroke of the plunger to thereby initiate injection of fuel to said outlet, said pump means being responsive to the speed of rotation of said engine to pressurize the fuel in said inlet;

means for detecting the speed of said engine;

a source of voltage having a tendency to vary;

soleniod valve means operable when a voltage is applied thereto from said source for providing a pressure relief action of the fuel in said compression chamber to terminate the injection of fuel;

a memory storing trimming data in locations addressable as a function of the detected voltage and as a function of the detected engine speed; and control means for detecting the voltage of said source and responsive to the initiation of the fuel injection for determining the basic timing at which the fuel injection is to be terminated, reading trimming data out of said memory as a function of said detected voltage and as a function of said detected engine speed, correcting the basic timing in accordance with said trimming data and applying the voltage of said source to said solenoid valve means at said corrected timing to thereby terminate the fuel injection.

9. A fuel injection pump as claimed in claim 8, further comprising:

means for varying a phase of the reciprocating movement of said plunger in accordance with the speed of said engine;

signal generating means for detecting a predetermind angular position of said plunger and applying a signal in response to the detection of the predetermined angular position to said control means as an indication of the initiation of fuel injection; and means for adjustably mounting said signal generating means in a variable angular position with respect to said plunger in response to said phase varying means.

10. A fuel injection pump as claimed in claim 8, wherein said control means includes a memory for storing trimming data in locations addressable as a function of the detected voltage and as a function of the detected engine speed and means for reading a stored data upon the initiation of fuel injection and correcting said basic timing with said trimming data.

* * * * *